(12) United States Patent
Teyeb et al.

(10) Patent No.: US 10,341,905 B2
(45) Date of Patent: Jul. 2, 2019

(54) REPORTING INTRA-WLAN MOBILITY TO 3GPP

(71) Applicant: TELEFONAKTIEBOLAGET LM ERICSSON (PUBL), Stockholm (SE)

(72) Inventors: Oumer Teyeb, Solna (SE); Mattias Tan Bergström, Stockholm (SE); Filip Mestanov, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 178 days.

(21) Appl. No.: 15/016,526

(22) Filed: Feb. 5, 2016

(65) Prior Publication Data
US 2016/0242078 A1 Aug. 18, 2016

Related U.S. Application Data

(60) Provisional application No. 62/112,383, filed on Feb. 5, 2015.

(51) Int. Cl.
*H04W 4/00* (2018.01)
*H04W 36/00* (2009.01)
(Continued)

(52) U.S. Cl.
CPC ... *H04W 36/0022* (2013.01); *H04W 36/0016* (2013.01); *H04W 36/0061* (2013.01);
(Continued)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS

| 2006/0291417 A1* | 12/2006 | Aust | H05K 13/0404 370/331 |
| 2010/0316036 A1* | 12/2010 | Jeyaseelan | H04W 36/30 370/338 |

(Continued)

OTHER PUBLICATIONS

3rd Generation Partnership Project; Technical Specification Group Services and System Aspects; Architecture enhancements for non-3GPP accesses (Release 13). 3GPP TS 23.402 V13.0.0 (Dec. 2014).

*Primary Examiner* — Siren Wei

(57) ABSTRACT

According to some embodiments, a method in a wireless device operable in a first wireless communication network and a second wireless communication network comprises receiving, from the first wireless communication network, an identification of network nodes of the second wireless communication network. The network nodes of the second wireless communication network are operable to process traffic for the wireless device. The method further comprises receiving an instruction from the second wireless communication network to move traffic from a first network node of the second wireless communication network to a second network node of the second wireless communication network. The first network node is one of the identified one or more network nodes of the second wireless communication network. The method also comprises determining that an identification of the second network node is not included in the received identification of one or more network nodes of the second wireless communication network.

26 Claims, 6 Drawing Sheets

(51) Int. Cl.
*H04W 36/14* (2009.01)
*H04W 84/04* (2009.01)
*H04W 84/12* (2009.01)

(52) U.S. Cl.
CPC .......... *H04W 36/14* (2013.01); *H04W 84/042* (2013.01); *H04W 84/12* (2013.01)

(56) References Cited

U.S. PATENT DOCUMENTS

| | | | | |
|---|---|---|---|---|
| 2013/0174228 A1* | 7/2013 | Etchegoyen | .......... | H04W 12/08 726/4 |
| 2013/0322238 A1* | 12/2013 | Sirotkin | ............ | H04W 28/0247 370/230 |
| 2014/0079022 A1* | 3/2014 | Wang | .................... | H04W 36/22 370/331 |
| 2015/0109927 A1* | 4/2015 | Ozturk | .............. | H04W 36/0027 370/235 |
| 2015/0365887 A1* | 12/2015 | Tong | .................... | H04W 76/14 370/328 |
| 2016/0029295 A1* | 1/2016 | Nagasaka | ............. | H04W 48/18 370/237 |

* cited by examiner

REPORTING INTRA-WLAN MOBILITY TO 3GPP

TECHNICAL FIELD

Particular embodiments relate generally to wireless communications and more particularly to interworking between Third Generation Partnership Project (3GPP) networks and wireless local area networks (WLAN), such as reporting intra-WLAN mobility to 3GPP.

BACKGROUND

3GPP includes mechanisms for radio interworking between 3GPP and WLAN. The interworking improves operator control over how a user equipment (UE) performs access selection and traffic steering between 3GPP and WLANs that belong to the operator or the operator's partners. In some scenarios, the interworking may be used with other, non-operator WLANs as well.

The term 3GPP signal, as used herein, may refer to a signal transmitted by a radio network node belonging to 3GPP radio access technology (RAT) (e.g. LTE, HSPA, GSM, etc.). The term may also refer to the quality of such a signal.

The term WLAN signal, as used herein, may refer to a signal transmitted by a radio network node belonging to WLAN (e.g., 802.11 access point (AP), etc.). The term may also refer to the quality of such a signal.

3GPP/WLAN interworking may include various mechanisms for interworking. One example is network assisted (or threshold based) interworking. Another example may be referred to as network controlled interworking.

In network assisted interworking, the 3GPP radio access network (RAN) provides parameters that assist the UE with access selection and traffic steering. The RAN assistance parameters include three main components: threshold values, offloading preference indicator (OPI), and WLAN identifiers. The UE also receives RAN rules/policies that may use the assistance parameters.

For example, the threshold values may include 3GPP signal related metrics such as reference signal received power (RSRP), reference signal received quality (RSRQ), received signal code power (RSCP), or energy per chip/noise spectral density ratio (Ec/No), etc., and WLAN signal related metrics such as received channel power indicator (RCPI), received signal strength indication RSSI, WLAN load/utilization, WLAN backhaul load/capacity, etc. An example of a RAN rule that uses the threshold value is a rule that specifies that a UE should connect to a WLAN if a 3GPP signal level is below a signaled 3GPP signal level threshold at the same time as a WLAN signal level is above a signaled WLAN signal level threshold. Similarly, another rule may use thresholds to determine when a UE should steer traffic back from WLAN to 3GPP. An example algorithm may be expressed with the following pseudo code.

```
if (3GPP signal < threshold1) && (WLAN signal > threshold2) {
    steerTrafficToWLAN( );
} else if (3GPP signal > threshold3) || (WLAN signal < threshold4) {
    steerTrafficTo3gpp( );
}
```

In this interworking mechanism, it may not be feasible or desirable for the UE to consider any possible WLAN when deciding where to steer traffic. For example, an operator may not find it feasible that the UE uses this interworking mechanism to steer traffic to a WLAN that does not belong to the operator. Thus, one option is that the 3GPP RAN may send a list of WLAN identifiers to the UE, and the UE may apply the interworking mechanism only to the listed WLANs.

The 3GPP RAN may provide additional parameters used for Access Network Discovery and Selection Function (ANDSF) policies. One parameter is an offloading preference indicator (OPI). In one example, the OPI is compared to a threshold in the ANDSF policy to trigger various actions. In another example, OPI is used as a pointer to select various parts of the ANDSF policy which would then be used by the UE.

The RAN assistance parameters (e.g., thresholds, WLAN identifiers, OPI) provided by 3GPP RAN may be communicated with dedicated signaling and/or broadcast signaling. The 3GPP RAN may only send dedicated parameters to the UE when the UE has a valid radio resource control (RRC) connection to the 3GPP RAN. A UE that has received dedicated parameters may apply the dedicated parameters; otherwise, the UE may apply the broadcast parameters.

If no RRC connection is established between the UE and the 3GPP RAN, the UE cannot receive dedicated parameters. When an RRC connection has been terminated, however, a UE may apply dedicated parameters previously received from the 3GPP RAN. For example, when entering RRC_IDLE mode in LTE (or when entering idle mode, URA_PCH, or CELL_PCH in UMTS) the UE may continue to apply dedicated RAN assistance parameters for some amount of time. After the timer has expired, the UE may discard the dedicated parameters and apply broadcast parameters.

ANDSF may use the thresholds and OPI parameters communicated by the 3GPP RAN to a UE. If ANDSF policies are provided to the UE, then the UE may use the ANDSF policies instead of the 3GPP RAN rules/policies (i.e. ANDSF takes precedence).

In network controlled interworking, the 3GPP network fully controls the interworking mechanism. The 3GPP network configures the UE to send measurement reports related to WLANs the UE has discovered (or for WLANs that satisfy certain conditions). The network, based on the measurement reports, decides whether the UE should steer traffic towards one of the reported WLANs. If the UE should steer traffic towards a WLAN, the 3GPP network sends a traffic steering command to the UE.

For example, traffic steering for UEs in RRC CONNECTED/CELL_DCH state may be controlled by the 3GPP network using dedicated traffic steering commands, potentially based also on WLAN measurements (reported by the UE). UEs in IDLE mode and CELL_FACH, CELL_PCH and URA_PCH states may use a mechanism similar to the threshold based approach described above. Alternatively, UEs in these RRC states may be configured to connect to the 3GPP RAN and wait for dedicated traffic steering commands.

FIG. 1 illustrates example traffic steering steps for UEs in a connected state. FIG. 1 illustrates communications between a UE in RRC CONNECTED/CELL_DCH state and an eNodeB or Radio Network Controller (RNC).

Step 1 may be referred to as measurement control. As part of measurement control, the eNodeB/RNC configures the UE measurement procedures, which includes the identity of a target WLAN to measure.

Step 2 may be referred to as measurement report. As part of measurement report, the UE is triggered to send a measurement report according the rules specified as part of measurement control.

Step 3 may be referred to as traffic steering. As part of traffic steering, the eNodeB/RNC sends a steering command message to the UE to perform the traffic steering based on the reported measurements and traffic loading in the RAN.

For measurement control, examples of information that the UE can be configured to measure include: (1) events that trigger reporting; (2) target identifiers; and (3) types of measurements to report.

Events that trigger reporting may include: (1) a WLAN measurement goes above a threshold (possibly triggering traffic steering to the WLAN); (2) a WLAN measurement goes below a threshold (possibly triggering traffic steering away from the WLAN); (3) a 3GPP cell's radio quality goes below a first threshold and a WLAN's radio quality goes above a second threshold (possibly triggering traffic steering to the WLAN); and (4) a WLAN's radio quality goes below a first threshold and a 3GPP cell's radio quality goes above a second threshold (possibly triggering traffic steering away from the WLAN).

Target identifiers may indicate to a UE which WLANs to measure. Target identifiers may include the WLAN ID and particular operating channels to measure. Examples of target identifiers are included in the following table.

| Identifier | Description | Availability in WLAN |
|---|---|---|
| BSSID | Basic Service Set Identifier: For infrastructure BSS, the BSSID is the MAC address of the wireless access point. | Beacon or Probe Response |
| SSID | Service Set Identifier: The SSID may be used in multiple, possibly overlapping, BSSs. | Beacon or Probe Response |
| HESSID | Homogeneous Extended Service Set Identifier: A MAC address whose value may be configured by a Hotspot Operator with the same value as the BSSID of one of the APs in the network. All APs in the wireless network shall be configured with the same HESSID value. | Beacon or Probe Response (802.11) |
| Domain Name List | Domain Name List: element provides a list of one or more domain names of the entity operating the WLAN access network. | ANQP (HS 2.0) |
| Operating class, channel number | Indication of the target WLAN frequency. See Annex E of 802.11 for definitions of the different operating classes | N/A |

If the information in the table above is not available in eNB/RNC, the RAN may configure general WLAN measurements.

Examples of measurement reports are included in the following table.

| Identifier | Description | Availability in WLAN |
|---|---|---|
| RCPI | Received Channel Power Indicator: Measure of the received RF power in the selected channel for a received frame in the range of −110 to 0 dBm. | Measurement |
| RSNI | Received Signal to Noise Indicator: An indication of the signal to noise plus interference ratio of a received IEEE 802.11 frame. Defined by the ratio of the received signal power (RCPI-ANPI) to the noise plus interference power (ANPI) in steps of 0.5 dB in the range from −10 dB to +117 dB. | Measurement |
| RSSI | Received Signal Strength Indicator: indication of the total RF power being received. | Measurement |
| BSS Load | Domain Name List: element provides a list of one or more domain names of the entity operating the WLAN access network. | Beacon or Probe Response (802.11k) |
| WAN Metrics | Indication of the target WLAN frequency. See Annex E of 802.11 for definitions of the different operating classes | ANQP (HS 2.0) |

Traffic steering may include routing traffic. For the 3GPP RAN to control traffic routing (if supported) if ANDSF is not used, the 3GPP RAN needs to know which access point names (APNs) and bearers may be offloaded and which may not. The 3GPP RAN also needs a mechanism to inform the UE accordingly, so that the UE can, for example, issue a corresponding binding update with the core network (CN) over S2c. This can impact signaling between CN and eNodeB as well as the UE behavior between the access stratum (AS) and the non-access stratum (NAS). Examples of traffic to steer to or from the WLAN may include: (1) data radio bearer (DRB)/radio bearer ID (RB-ID) (i.e., the identity of a radio bearer); and (2) quality of service class identifier (QCI).

In the network assisted interworking, the 3GPP RAN indicates a set of possible WLAN identifiers that a UE should consider and the UE applies RAN rules to that set of WLANs. Similarly, in network controlled interworking the 3GPP RAN may configure a UE with a list of WLAN identifiers that the UE should measure, and the UE will report when measurement triggering conditions are satisfied for any of the WLANs identified in the list.

The WLAN includes its own mechanisms for handing over between various WLAN access points. The handover may be based on load or mobility reasons within the WLAN. A particular problem is that the WLAN steering mechanisms may conflict with the 3GPP RAN steering mechanism can result in a UE ping-ponging between WLAN access points.

For example, the 3GPP RAN may provide a UE with a WLAN identifier list that contains WLAN AP1 (e.g., AP1 has the same SSID/HESSID as one of the entries in the WLAN identifier list, or its BSSID is explicitly indicated in the list). AP2 is not in the WLAN identifier list. At some time, the UE steers its traffic to AP1 (e.g., either the conditions for the RAN rules are satisfied in network assisted interworking, or an explicit traffic steering command is received in network controlled interworking). The UE then travels into the coverage area of AP2 and the WLAN handover mechanism transfers the UE to AP2. At this point, the 3GPP RAN steering mechanism may force the UE to connect to AP1 again if the conditions for steering are satisfied. Or the UE may send a measurement report that includes only AP1, and the 3GPP RAN may send a command to steer traffic to AP1 again. After the UE returns to AP1, the WLAN mechanism may trigger the handover to AP2 again. The handover between AP1 and AP2 may continue indefinitely, resulting in a ping-pong effect.

SUMMARY

According to some embodiments, a method in a wireless device operable in a first wireless communication network and a second wireless communication network comprises receiving, from the first wireless communication network, an identification of network nodes of the second wireless communication network. The network nodes of the second wireless communication network are operable to process traffic for the wireless device. The method further comprises receiving an instruction from the second wireless communication network to move traffic from a first network node of the second wireless communication network to a second network node of the second wireless communication network. The first network node is one of the identified one or more network nodes of the second wireless communication network. The method also comprises determining that an identification of the second network node is not included in the received identification of one or more network nodes of the second wireless communication network.

In particular embodiments, the first wireless communication network comprises a 3GPP radio access technology and the second wireless communication network comprises a wireless local area network (WLAN) radio access technology. Particular embodiments include reporting, to the first wireless network, an identifier of the second network node of the second wireless communication network or a reason for moving traffic from the first network node of the second wireless communication network to the second network node of the second wireless communication network. The reason for moving traffic from the first network node of the second wireless communication network to the second network node of the second wireless communication network may include at least one of switching frequency bands, load balancing, signal quality, detected interference, priority service, and channel usage.

In particular embodiments, the method includes receiving, from the first wireless communication network, an updated identification of one or more network nodes of the second wireless communication network operable to process traffic for the wireless device, the updated identification including an identification of the second network node or not including an identification of the first network node.

According to some embodiments, a method in a network node of a first wireless communication network comprises communicating, to a wireless device operable in the first wireless communication network and operable in a second wireless communication network, an identification of one or more network nodes of the second wireless communication network. The one or more network nodes of the second wireless communication network are operable to process traffic for the wireless device. The method further comprises receiving, from the wireless device, a report that the wireless device moved traffic from a first network node of the second wireless communication network to a second network node of the second wireless communication network. The first network node is one of the identified one or more network nodes of the second wireless communication network.

In particular embodiments, the first wireless communication network comprises a 3GPP radio access technology and the second wireless communication network comprises a wireless local area network (WLAN) radio access technology.

In particular embodiments, the received report comprises a reason for moving the traffic from the first network node of the second wireless communication network to the second network node of the second wireless communication network. The reason for moving the traffic from the first network node of the second wireless communication network to the second network node of the second wireless communication network may include at least one of switching frequency bands, load balancing, signal quality, detected interference, priority service, and channel usage.

In particular embodiments, the second network node is not included in the identification of one or more network nodes of the second wireless communication network.

Particular embodiments include updating the identification of one or more network nodes of the second wireless communication network to include an identification of the second network node or not to include an identification of the first network node, and communicating, to the wireless device, the updated identification of one or more network nodes of the second wireless communication network. In some embodiments the updated identification of one or more network nodes of the second wireless communication network is valid for a predetermined amount of time.

In particular embodiments, upon receiving the report that the wireless device moved traffic from of the second wireless communication network to the second network node of the second wireless communication network, the network node suspends, for a predetermined amount of time, sending any instructions to the wireless device to move traffic.

According to some embodiments, a wireless device operable in a first wireless communication network and a second wireless communication network comprises a processor operable to receive, from the first wireless communication network, an identification of one or more network nodes of the second wireless communication network. The one or more network nodes of the second wireless communication network are operable to process traffic for the wireless device. The processor is further operable to receive an instruction from the second wireless communication network to move traffic from a first network node of the second wireless communication network to a second network node of the second wireless communication network. The first network node is one of the identified one or more network nodes of the second wireless communication network. The processor is further operable to determine that an identification of the second network node is not included in the received identification of one or more network nodes of the second wireless communication network.

According to some embodiments, a network node of a first wireless communication network comprises a processor operable to communicate, to a wireless device operable in the first wireless communication network and operable in a second wireless communication network, an identification of one or more network nodes of the second wireless communication network. The one or more network nodes of the second wireless communication network are operable to process traffic for the wireless device. The processor is further operable to receive, from the wireless device, a report that the wireless device moved traffic from a first network node of the second wireless communication network to a second network node of the second wireless communication network. The first network node is one of the identified one or more network nodes of the second wireless communication network.

According to some embodiments, a wireless device operable in a first wireless communication network and a second wireless communication network comprises a receiving module and a determining module. The receiving module is operable to receive, from the first wireless communication network, an identification of one or more network nodes of the second wireless communication network. The one or more network nodes of the second wireless communication network are operable to process traffic for the wireless device. The receiving module is further operable to receive an instruction from the second wireless communication network to move traffic from a first network node of the second wireless communication network to a second network node of the second wireless communication network. The first network node is one of the identified one or more network nodes of the second wireless communication network. The determining module is operable to determine that an identification of the second network node is not included in the received identification of one or more network nodes of the second wireless communication network.

According to some embodiments, a network node of a first wireless communication network comprises a communication module and a receiving module. The communication module is operable to communicate, to a wireless device operable in the first wireless communication network and operable in a second wireless communication network, an identification of one or more network nodes of the second wireless communication network. The one or more network nodes of the second wireless communication network are operable to process traffic for the wireless device. The receiving module is operable to receive, from the wireless device, a report that the wireless device moved traffic from a first network node of the second wireless communication network to a second network node of the second wireless communication network. The first network node one of the identified one or more network nodes of the second wireless communication network.

Also disclosed is a computer program product. The computer program product comprises instructions stored on non-transient computer-readable media which, when executed by a processor, perform the acts of receiving, from the first wireless communication network, an identification of network nodes of the second wireless communication network. The network nodes of the second wireless communication network are operable to process traffic for the wireless device. The instructions, when executed, also perform the act of receiving an instruction from the second wireless communication network to move traffic from a first network node of the second wireless communication network to a second network node of the second wireless communication network. The first network node is one of the identified one or more network nodes of the second wireless communication network. The instructions, when executed, also perform the act of determining that an identification of the second network node is not included in the received identification of one or more network nodes of the second wireless communication network.

Another computer program product comprises instructions stored on non-transient computer-readable media which, when executed by a processor, perform the acts of communicating, to a wireless device operable in the first wireless communication network and operable in a second wireless communication network, an identification of one or more network nodes of the second wireless communication network. The one or more network nodes of the second wireless communication network are operable to process traffic for the wireless device. The instructions, when executed, also perform the act of receiving, from the wireless device, a report that the wireless device moved traffic from a first network node of the second wireless communication network to a second network node of the second wireless communication network. The first network node is one of the identified one or more network nodes of the second wireless communication network.

Particular embodiments may exhibit some of the following technical advantages. In particular embodiments, methods in either a wireless device or a network node facilitate a mobility mechanism deployed in a first network (such as a 3GPP network) interworking with a mobility mechanism deployed in a second network (such as a WLAN). Particular embodiments avoid situations where the mobility mechanisms would give conflicting directives.

For example, a first network may indicate, to a wireless device, a set of possible network node identifiers of network nodes in a second network that the wireless device should consider for traffic steering. After the wireless device steers traffic to one of the indicated network nodes of the second network, the second network may use its own intra-network mechanisms for handing over among network nodes and steer traffic to another network node in the second network. If the first network is unaware of the new network node, conflicts between the two steering mechanisms may result in undesirable side effects, such as the wireless device ping-ponging between network nodes in the second network.

In particular embodiments, the wireless device may compare an identifier of the new network node to the list of possible network node identifiers received from the first network. If the wireless device determines the first network is unaware of the new network node, then the wireless device may take steps to avoid conflicts between steering mechanisms of the first and second networks.

For example, the wireless device may report mobility events from the second network to the first network. In some embodiments, the first network may use the knowledge of the mobility event (e.g., knowledge of the existence of a previously unknown network node) when determining what steering information to send to the wireless device, thus avoiding undesirable side effects. The first network may add previously unknown network nodes to the list of possible network node identifiers that the wireless device should consider for traffic steering, or the first network may remove previously known network node identifiers from the list of possible network node identifiers.

As another example, a wireless device may autonomously modify its own configuration to be aware of the new network node and to prevent ping-ponging. In some embodiments, the wireless device may autonomously update its known set of network node identifiers for which the wireless device monitors thresholds or reports measurements.

Some embodiments may benefit from some, none, or all of these advantages. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Mechanisms for radio interworking between 3GPP and WLAN may improve operator control over how a UE performs access selection and traffic steering between 3GPP and WLANs. The interworking may involve a 3GPP RAN indicating a set of possible WLAN identifiers that a UE should consider for traffic steering. After the UE steers traffic to one of the indicated WLAN access points, the WLAN access point may use its own intra-WLAN mechanisms for handing over among WLAN access points and steer traffic to another access point. If the 3GPP RAN is unaware of the new WLAN access point, conflicts between the WLAN steering mechanism and the 3GPP RAN steering mechanism may result in undesirable side effects, such as the UE ping-ponging between WLAN access points.

An object of the present disclosure is to obviate at least the disadvantages above and provide an improved method of mobility interworking between wireless networks. For example, after an intra-WLAN mobility event steers a UE's traffic to another WLAN access point, the UE may compare the new WLAN access point with the set of possible WLAN identifiers previously received from the 3GPP RAN. If the new WLAN access point was previously unknown to the 3GPP RAN, then the UE may take steps to avoid conflicts between WLAN and 3GPP RAN steering mechanisms.

For example, in particular embodiments the UE may report mobility events from the WLAN to the 3GPP RAN. The 3GPP RAN may use the knowledge of the WLAN mobility event (e.g., knowledge of the existence of a previously unknown WLAN access point) when determining what steering information to send to the UE, thus avoiding undesirable side effects. In some embodiments the 3GPP RAN may add previously unknown WLAN access points to the set of possible WLAN identifiers that the UE should consider for traffic steering. In some embodiments the 3GPP RAN may remove previously known WLAN access points from the set of possible WLAN identifiers.

As another example, a UE may autonomously modify its own configuration to be aware of the new WLAN access point and to prevent ping-ponging. In some embodiments, the UE may autonomously update its known set of WLAN access points for which the UE monitors thresholds or reports measurements.

Particular embodiments are described with reference to FIGS. 2-6B of the drawings, like numerals being used for like and corresponding parts of the various drawings. LTE is used throughout this disclosure as an example cellular system, but the ideas presented herein apply to other wireless communication systems as well. The embodiments and examples described herein may also apply to other RATs. For example, in UMTS the "Connected" state is divided into several sub-states where some states are more similar to LTE IDLE mode than to LTE CONNECTED mode. One will appreciate that even though a certain procedure may be applied when a wireless terminal is in a certain state, the procedure may apply to other RATs in other states.

Figure 2:
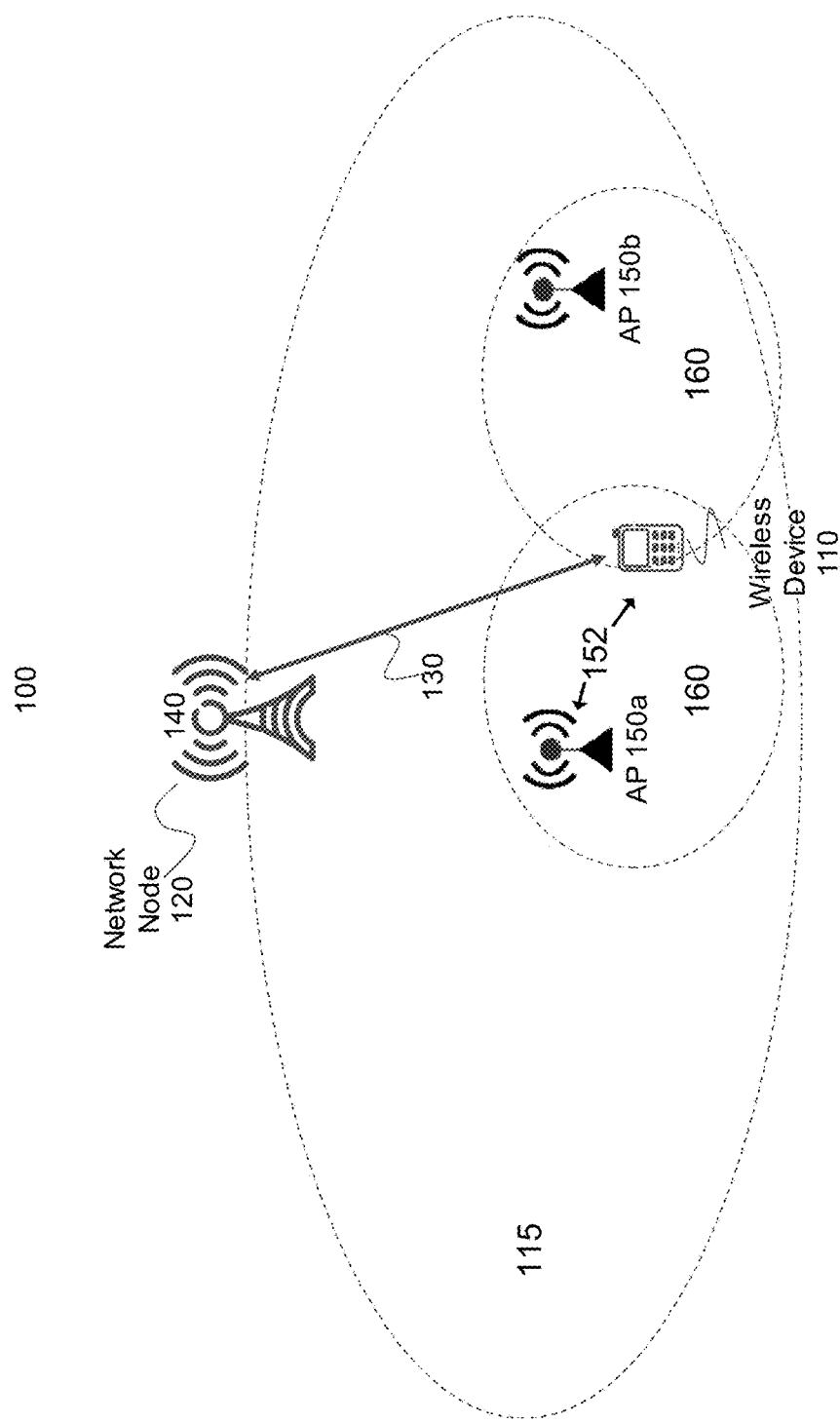
FIG. 2 is a block diagram illustrating an example of a wireless radio network, according to a particular embodiment.

FIG. 2 is a block diagram illustrating an example of a wireless radio network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes. The network nodes include network nodes 120, such as base stations or eNodeBs. Network node 120 serves coverage area 115 (also referred to as cell 115). The network nodes also include network nodes 150, such as WIFI access points.

In general, wireless devices 110 that are within coverage of network node 120 (e.g., within cell 115 served by network node 120) communicate with network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. In particular embodiments, the wireless communication network served by network node 120 may be referred to as a 3GPP RAN.

Network node 120 transmits and receives wireless signals 130 using antenna 140. In particular embodiments, network node 120 may comprise multiple antennas 140. For example, network node 120 may comprise a multi-input multi-output (MIMO) system with two, four, or eight antennas 140.

Wireless device 110 may communicate with more than one radio access technology. Wireless devices 110 that are within coverage of network node 150 (e.g., within wireless communication network 160 served by network node 150) may communicate with network node 150 by transmitting and receiving wireless signals 152. For example, wireless devices 110 and radio network node 150 may communicate wireless signals 152 containing voice traffic, data traffic, and/or control signals. In some embodiments, a network node 150 communicating voice traffic, data traffic, and/or control signals to wireless device 110 may be referred to as a WLAN access point 150 for the wireless device 110. The wireless communication network served by network nodes 150 (i.e., wireless communication network 160) may be referred to as a WLAN.

Wireless communication network 160 and cell 115 may be operated by the same or different operators. In some embodiments, wireless communication network 160 may include a residential WLAN.

In particular embodiments, each network node 150 in wireless communication network 160 may be identified by a basic service set identifier (BSSID). The BSSID may be the media access control (MAC) address of the wireless access point. Wireless communication network 160 may be identified by a service set identifier (SSID). The SSID may refer to all network nodes 150 (e.g., 150*a* and 150*b*) in wireless communication network 160. In some embodiments, wireless communication network 160 may be identified by a homogenous extended service set identifier (HESSID). The HESSID may be associated with a subscription service provider (SSP) associated with wireless communications network 160 and may refer to all network nodes 150 (e.g., 150*a* and 150*b*) in wireless communication network 160.

In some embodiments, the network nodes 150 may be identified by a domain name associated with wireless communications network 160 or by an operating class or operating frequency associated with wireless communications network 160.

During operation, wireless device 110 may communicate with more than one network node 120 or 150. For example, wireless device 110 may move between coverage areas served by different network nodes 120, different network nodes 150, or wireless device 110 may move from a coverage area served by network node 120 to a coverage area served by network node 150, or vice versa. Moving between coverage areas may be referred to as handover, access selection, traffic steering, or generally as mobility.

Network node 120 may provide thresholds or instructions to wireless device 110 to assist wireless device 110 in determining when to connect to another network, such as wireless communication network 160. Such assistance may be referred to as interworking. For example, network node 120 may provide wireless device 110 with a list of identifiers of network nodes 150 to which wireless device 110 may potentially connect. In particular embodiments, the list may include an explicit list (e.g., BSSIDs of specific network nodes 150), an implicit list (e.g., SSID, HESSID, domain name, etc. of one or more network nodes 150), or any combination of explicit and implicit identifiers. Interworking may also include specifying parameters, such as radio conditions, for when wireless device 110 should connect or disconnect to or from network node 150.

Wireless device 110 may assist with interworking by notifying network node 120 about mobility events between network nodes 150. For example, if wireless device 110 disconnects from network node 150a and connects to network node 150b (also referred to as a mobility event), then wireless device 100 may inform network node 120 of the mobility event. An advantage of the notification is that if network node 120 was not previously aware of network node 150b, then network node 120 is made aware by the notification and is able to consider network node 150b during any future traffic steering determinations.

In network 100, each network node 120 or 150 may use any suitable radio access technology, such as LTE, LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 5A below. Similarly, a network node may include any suitable combination of hardware and/or software. For example, in particular embodiments, a network node, such as network node 120, may include the components described with respect to FIG. 6A below.

The embodiments described herein are described with respect to the interworking between LTE and WLAN. The embodiments are also applicable, however, for interworking between WLAN and other 3GPP RATs (e.g., UMTS), 3GPP and non 3GPP RATs other than WLAN (e.g., UMTS and WiMAX) or even between two 3GPP RATs (e.g., UMTS and LTE). Some embodiments and examples described herein may refer to steps performed in the context of a particular interworking mechanism (e.g., network assisted, network controlled, etc.). One will appreciate that these embodiments and examples may also apply to other interworking mechanisms.

In particular embodiments, when a wireless device changes the WLAN access point that it is currently connected or associated with because of, for example, intra-WLAN steering mechanisms (e.g., BSS transition management, etc.), then the wireless device reports the event to the 3GPP RAN. In the report, the wireless device may include a cause value (or reason) that may identify the WLAN steering mechanism that led to the steering event. For example, possible reasons may include: (1) switching bands in the same access point; (2) load balancing; (3) signal quality; (4) interference detected; (5) priority service requirements (e.g., video vs. data); and (5) assigned channel usage (e.g., channels reserved for premium users).

Figure 1:
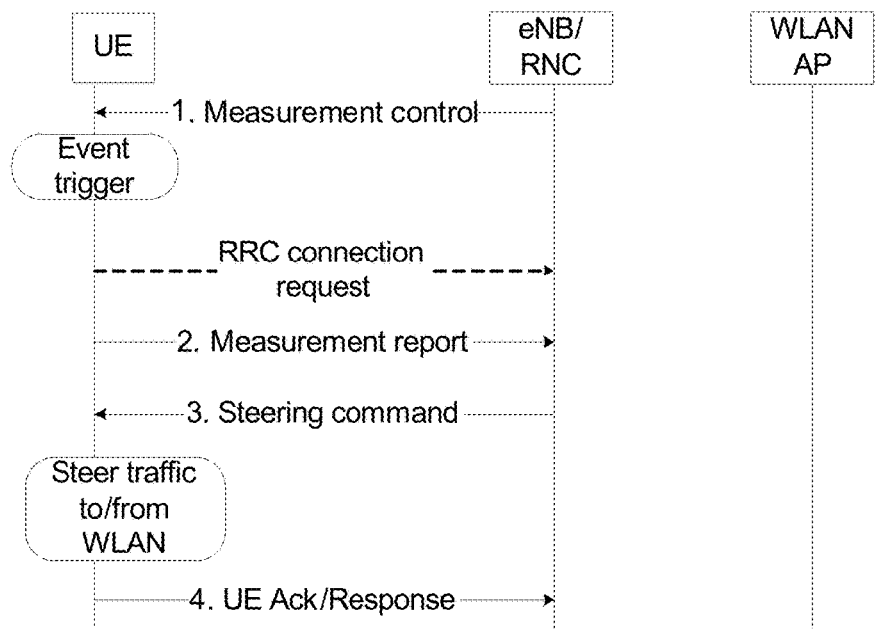
FIG. 1 illustrates example traffic steering steps for UEs in a connected state.

As a particular example with respect to FIG. 1, a WLAN network node, such as network node 150a, may handoff a UE, such as wireless device 110, to a second WLAN network node, such as WLAN network node 150b, to balance the traffic load between network nodes 150a and 150b. Wireless device 110 may report the handoff and the reason for the handoff to a 3GPP RAN network node, such as network node 120.

In particular embodiments, if a network is employing an interworking mechanism such as network assisted interworking, and the network node has supplied the wireless device with a list of candidate WLAN identifiers (e.g., BSSID, SSID, HESSID, etc.), then the mobility event notification is sent to the network node only if the new WLAN access point belongs to a WLAN that is not included in the supplied list of candidate WLAN identifiers. In some embodiments, the indication is sent if the new WLAN access point does not belong to the same SSID or HESSID of any of the identifiers in the list.

For example, the candidate list may include a list of BSSIDs. If the new WLAN access point is not in the list of BSSIDs, but the new WLAN access point belongs to the same SSID or HESSID as one of the BSSIDs in the list, then the notification is not sent to the network node. In other embodiments, the notification is sent to the network node even if the new WLAN access point belongs to the same SSID or HESSID as any of the BSSIDs in the list.

In some embodiments, after a wireless device connects to a WLAN access point in response to an intra-WLAN steering mechanism, the wireless device may add an identifier of the new WLAN access point (either permanently or for some duration of time) to the list of candidate WLAN identifiers received from the network node. Even though the new WLAN access point was not in the original list of candidate WLAN identifiers received from the network node, the wireless device may autonomously update its configuration.

As a particular example, a 3GPP RAN network node, such as network node 120, may instruct a UE, such as wireless device 110, to connect to a WLAN access point, such a network node 150a, with BSSID X. Wireless device 110 may determine that network node 150a with BSSID X also belongs to wireless communications network 160 with an SSID or HESSID of "Service Provider X." Wireless device 110 may determine that it may connect to any WLAN with an SSID or HESSID equal to "Service Provider X." If wireless device 110 later connects to a WLAN access point, such as network node 150*b*, with BSSID Y and SSID or HESSID of "Service Provider X," wireless device 110 may report network node 150*b* to network node 120. Network node 120 may determine to add an identifier of network node 150*b* to the list of candidate WLAN identifiers. In some embodiments, wireless device 110 may autonomously add an identifier of network node 150*b* to its received list of candidate WLAN identifiers.

In particular embodiments, if a network is employing an interworking mechanism such as network assisted interworking, and the network node has received a report from a wireless device that the wireless device was steered to a particular WLAN because of an intra-WLAN steering mechanism (e.g., steered to WLAN 1), then the network node may configure the wireless device to temporarily include the reported WLAN (WLAN 1) in the list of candidate WLANs for use with the 3GPP RAN rules.

In particular embodiments, if a network is employing an interworking mechanism such as network controlled interworking, the network node may consider the reported WLAN (WLAN 1) as a candidate for measurement reporting, traffic steering, and traffic aggregation. The network node may configure the wireless device (and other wireless devices) to start reporting measurements on WLAN 1.

In some embodiments, if a wireless device is steered to a particular WLAN (WLAN 1) because of an intra-WLAN steering mechanism, and then the wireless device is steered to another WLAN (WLAN 2) because of a 3GPP RAN steering mechanism (i.e., a ping-pong situation between the two steering mechanisms is created), then the WLAN that is the result of intra-WLAN steering (WLAN 1) may be removed from the list of candidate WLANs (either by the network node, or autonomously by the wireless device). In particular embodiments that employ an interworking mechanism such as network controlled interworking, the network node may remove WLAN 1 from the list of WLANs considered for measurement reporting or exclude WLAN 1 from a list of WLANs for which the network node may issue traffic steering commands.

In some embodiments, the steering to WLAN 2 may have been the result of intra-WLAN steering. In either situation, WLAN 1 may be removed from the list of candidate WLANS.

As described by various embodiments, WLANs may both be added and removed from the list of candidate WLANs. For example, a wireless device or network node may add WLAN 1 to the list of candidate WLANs based on intra-WLAN mobility. If the wireless device later leaves WLAN 1 (e.g., because of intra-WLAN steering or 3GPP RAN steering), then the wireless device or network node may remove WLAN 1 from the list of candidate WLANs. Thus, the addition of WLAN 1 to the list of candidate WLANs may be temporary.

In particular embodiments, additions to the list of candidate WLANs may only be valid for a specified amount of time. For example, if a network is employing an interworking mechanism such as network assisted interworking, then the network node might communicate to the wireless device to include a new WLAN in the list of candidate WLANs, but only for a specified amount of time. If a network is employing an interworking mechanism such as network controlled interworking, then the network node may configure the new WLAN for measurement reporting for a specified amount of time. The wireless device may start a timer when such an indication is received.

In particular embodiments, when the validity timer expires, the newly added WLAN may be removed from the list of candidate WLANs. Some embodiments may not remove the newly added WLAN when the timer expires if the wireless device is still connected or associated to the newly added WLAN at the expiration time. Some embodiments may remove the newly added WLAN whenever the wireless device is steered away from the newly added WLAN, even if the validity time has not expired.

A wireless device may be aware of particular WLANs even if the wireless device has not been steered to the any of those WLANs. In some embodiments, the wireless device may report, to the network node, any WLAN that that the wireless device is aware of, even if the wireless device is not currently connected to or associated with the particular WLAN.

In particular embodiments, the network node may prevent ping-ponging by disabling the 3GPP RAN steering mechanism. For example, if a wireless device reports that is has been steered to a WLAN that is not in the list of candidate WLANs, or that the wireless device has been steered to a WLAN different than a WLAN commanded by the 3GPP RAN network, then the 3GPP RAN network may temporarily suspend the steering mechanism for the wireless device. By deactivating the 3GPP steering mechanism when a risk of ping-ponging behavior is detected, the WLAN steering mechanism becomes the only active steering mechanism for some amount of time, which avoids conflicting directives.

Figure 3:
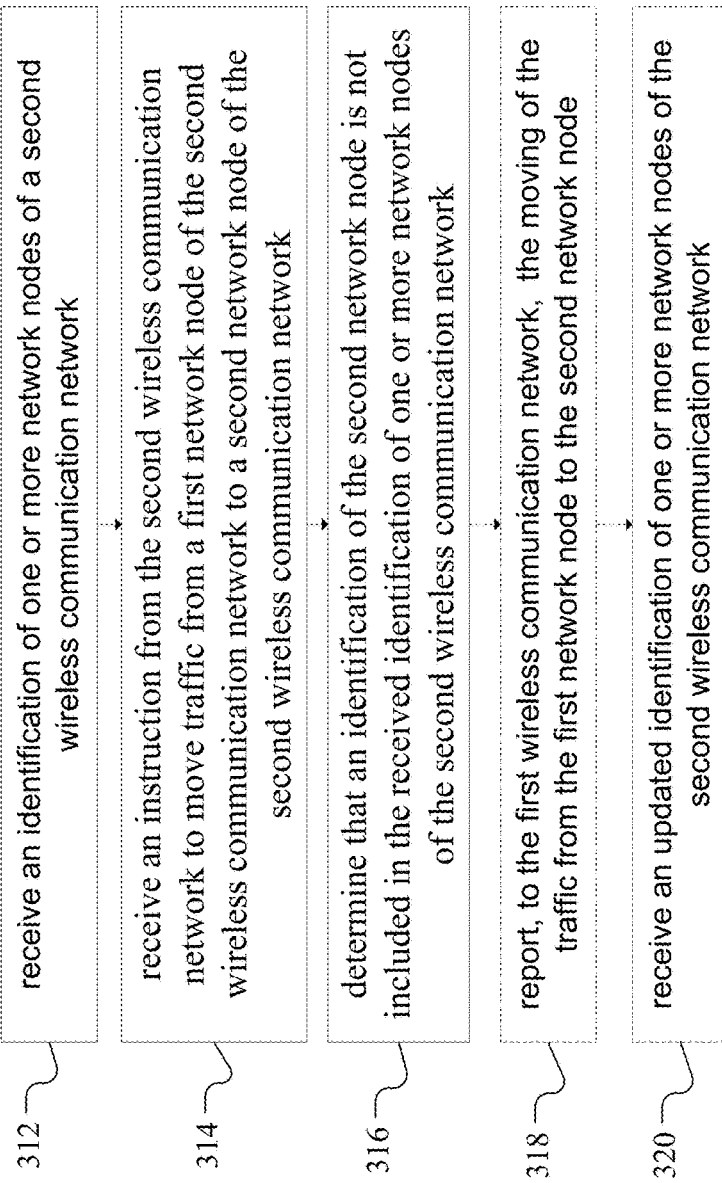
FIG. 3 is a flowchart of an example method in a wireless device of reporting intra-WLAN mobility to 3GPP, according to a particular embodiment.

FIG. 3 is a flowchart of an example method 300 in a wireless device of reporting intra-WLAN mobility to 3GPP, according to a particular embodiment. In particular embodiments, one or more steps of method 300 may be performed by components of network 100 described with reference to FIGS. 2-6B.

The method begins at step 312, where a wireless device receives an identification of one or more network nodes of a second wireless communication network. For example, a wireless device, such as wireless device 110, may receive an identification of one or more network nodes, such as network node 150*a*, of a second wireless communication network, such as wireless communication network 160, from a network node, such as network node 120, in a first communication network.

As a specific example, wireless device 110 may comprise a UE in a 3GPP RAN network and network nodes 150 may comprise WLAN access points. 3GPP RAN network node 120 may send the BSSID of WLAN access point 150*a* to UE 110. UE 110 may use the identification of one or more network nodes as a list of candidate WLANS. For example, under certain conditions (e.g., signal quality threshold comparison, steering commands, etc.) UE 110 may connect to WLAN access point 150*a* (i.e., UE 110 moves traffic to WLAN access point 150*a*).

The identification of one or more network nodes of the second wireless communication network may comprise any explicit or implicit identification of network nodes or group of network nodes. For example, a network node may be identified explicitly and individually by its BSSID. Alternatively or in combination, a network node or group of network nodes may be identified implicitly by an SSID, HESSID, domain name, channel or frequency identifier, or any other suitable identification of network nodes applicable to a particular wireless network. As a specific example, network nodes 150*a* and 150*b* may belong to wireless communication network 160 with an HESSID of "Service Provider X." The identification of one or more network nodes of the second wireless communication network may include the specific BSSID of network node 150a, or the identification may include the HESSID "Service Provider X." Either way, the identification at least refers to network node 150a. Particular embodiments may include any combination of identifiers.

At step 314, the wireless device receives an instruction from the second wireless communication network to move traffic from a first network node of the second wireless communication network to a second network node of the second wireless communication network. For example, wireless node 110 may receive an instruction from network node 150a to move its traffic from network node 150a to network node 150b.

As a specific example, at some time UE 110 may have received a steering command from 3GPP RAN network node 120 to steer its traffic to one of the identified network nodes, such as WLAN access point 150a in WLAN network 160. At this step (314), UE 110 may receive an intra-WLAN steering command from first WLAN access point 150a handing UE 110 over to second WLAN access point 150b.

In particular embodiments, the instruction to move traffic may comprise any mobility or traffic steering command applicable to the particular wireless communication network. Moving traffic from the first network node to the second network node may refer to moving bearer traffic, control traffic, or any other communication between wireless device and network node. In some embodiments, moving traffic may refer to associating with or connecting to a second network node even if bearer traffic is not exchanged.

At step 316, the wireless device determines that an identification of the second network node is not included in the received identification of one or more network nodes of the second wireless communication network. For example, wireless device 110 determines that network node 150b was not included in the received identification of one or more network nodes received at step 312.

As a specific example, the received identification of network nodes received at step 312 may include the single network node 150a identified by its BSSID. UE 110 may determine that the BSSID of WLAN access point 150b is not included in the received identification of network nodes.

Determining that an identification of the second network node is not included in the received identification of network nodes is not limited to an exact match. In some embodiments, the second network node may be considered included in the received identification of network nodes if the SSID or HESSID of the second network node matches the SSID or HESSID of another network node in the received identification of network nodes. For example, network node 150a (which is included in the received identification of network nodes by its BSSID) may also belong to the HESSID "Service Provider X." If network node 150b also belongs to the HESSID "Service Provider X," then some embodiments may consider node 150b included in the received identification of network nodes. In other embodiments, even if the second network node belongs to a SSID or HESSID included in the received identification of network nodes, the second network node may not be considered included in the received identification of network nodes.

At optional step 318, the wireless device reports, to the first wireless communication network, the moving of traffic from the first network node to the second network node. For example, wireless device 110 may report to network node 120 that wireless device 110 moved traffic from network node 150a to network node 150b.

Wireless device 110 may report the moving of traffic using any suitable communication or signaling between wireless device 100 and network node 120. In particular embodiments, the report may include a reason why the wireless device moved traffic from the first network node to the second network node. Examples may include switching bands in the same access point, load balancing, signal quality, interference detected, priority service requirements (e.g., video vs. data), assigned channel usage (e.g., channels reserved for premium users), or any other reason suitable to the particular wireless communication network.

Upon receiving the report, the network node may take any appropriate to avoid conflicts between the steering mechanism of the first wireless communication network and the steering mechanism of the second wireless communication network. For example, in some embodiments the first wireless communication network may disable its own steering mechanism for some amount of time after receiving the report. In some embodiments, the network node may modify its lists of candidate network nodes based on the received report.

At optional step 320, the wireless device receives an updated identification of one or more network nodes of the second wireless communication network. For example, wireless device 110 may receive an updated list of network nodes that includes both network node 150a and 150b. In other embodiments, the updated list of network nodes may include network node 150b, but no longer include network node 150a. In particular embodiments, the updated list of network nodes may include network node 150b along with a validity time period that indicates network node 150b is only valid for a particular amount of time.

Modifications, additions, or omissions may be made to the method of FIG. 3. Additionally, one or more steps in the method of FIG. 3 may be performed in parallel or in any suitable order. The method may be repeated as necessary over time.

Figure 4:
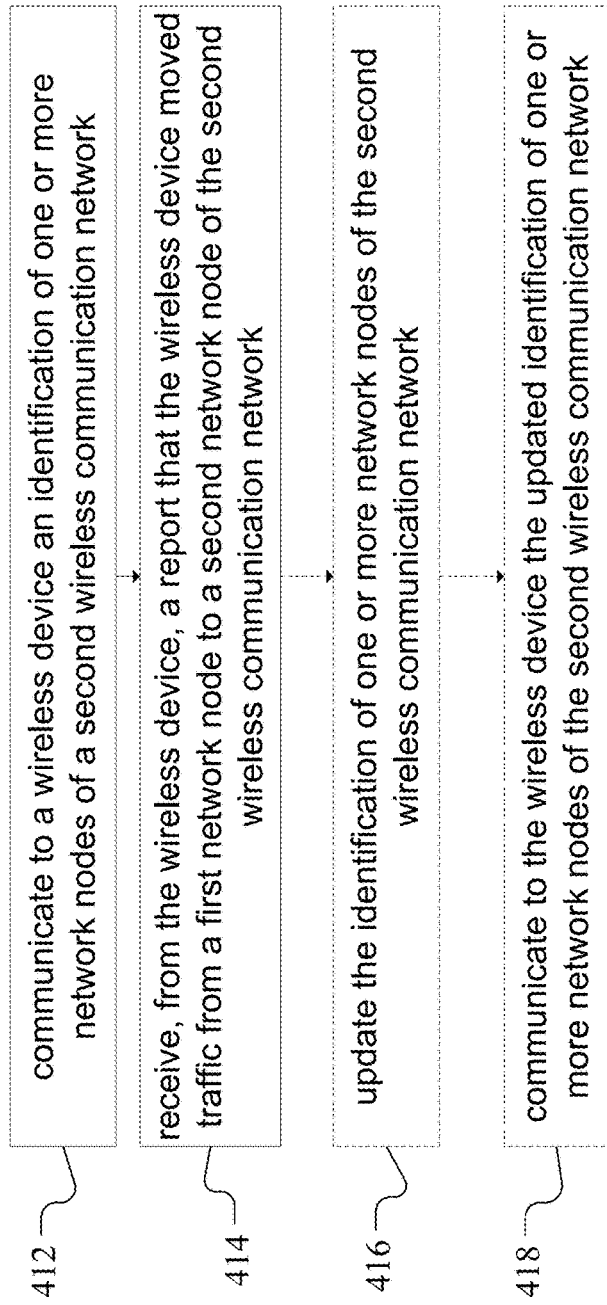
FIG. 4 is a flowchart of an example method in a network node of reporting intra-WLAN mobility to 3GPP, according to a particular embodiment.

FIG. 4 is a flowchart of an example method 400 in a network node of reporting intra-WLAN mobility to 3GPP, according to a particular embodiment. In particular embodiments, one or more steps of method 400 may be performed by components of network 100 described with reference to FIGS. 2-6B.

The method begins at step 412, where a network node communicates to a wireless device an identification of one or more network nodes of a second wireless communication network. For example, network node 120 may communicate to wireless device 110 an identification of network node 150a of second wireless communication network 160. As described with respect to FIG. 3, the identification of one or more network nodes of the second wireless communication network may comprise any explicit or implicit identification of network nodes or group of network nodes, such as a BSSID, SSID, HESSID, domain name, channel or frequency identifier, or any other suitable identification of network nodes applicable to a particular wireless network.

At step 414, the network node receives, from the wireless device, a report that the wireless device moved traffic from a first network node to a second network node of the second wireless communication network. For example, because of steering mechanism in wireless communication network 160, wireless device 110 may have moved its traffic from network node 150a to network node 150b. Wireless device 110 reports the moving of traffic to network node 120. In particular embodiments, the report may include a reason why the traffic was moved, such as switching bands in the same access point, load balancing, signal quality, interference detected, priority service requirements (e.g., video vs. data), assigned channel usage (e.g., channels reserved for premium users), or any other reason suitable to the particular wireless communication network.

At step 416, the network node updates the identification of one or more network nodes of the second wireless communication network. For example, network node 120 may add network node 150b to the identification of one or more network nodes, or network node 120 may remove network node 150a from the identification of one or more network nodes. In particular embodiments, network node 120 may use the report received at step 414 to update the identification of one or more network nodes in any suitable manner to avoid conflicts between a steering mechanism in the first wireless communication network and a steering mechanism in the second wireless communication network.

At step 418, the network node communicates, to the wireless device, the updated identification of one or more network nodes of the second wireless communication network. For example, network node 120 may communicate an identification of network node 150a and 150b to wireless device 110.

Modifications, additions, or omissions may be made to the method of FIG. 4. Additionally, one or more steps in the method of FIG. 4 may be performed in parallel or in any suitable order. The method may be repeated as necessary over time.

Figure 5A:
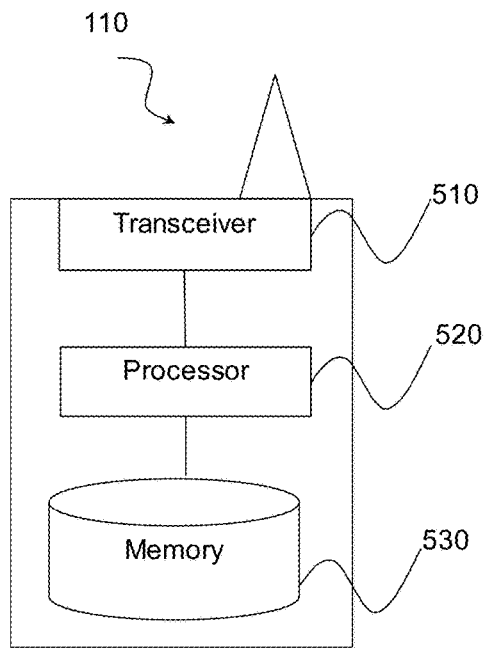
FIG. 5A is a block diagram illustrating an example embodiment of a wireless device.

FIG. 5A is a block diagram illustrating an example embodiment of a wireless device. The wireless device is an example of wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 510, processor 520, and memory 530. In some embodiments, transceiver 510 facilitates transmitting wireless signals to and receiving wireless signals from network nodes 120 and/or 150 (e.g., via an antenna), processor 520 executes instructions to provide some or all of the functionality described herein as provided by the wireless device, and memory 530 stores the instructions executed by processor 520.

Processor 520 includes any suitable combination of hardware and software implemented in one or more integrated circuits or modules to execute instructions and manipulate data to perform some or all of the described functions of the wireless device. Memory 530 is generally operable to store computer executable code and data. Examples of memory 530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 520 in communication with transceiver 510 receives an identification of network nodes from network node 120; receives intra-network steering events from network nodes 150; and transmits reports to network node 120. For example, processor 520 in communication with transceiver 510 may perform the steps of method 300 illustrated in FIG. 3. Other embodiments of the wireless device may include additional components (beyond those shown in FIG. 5A) responsible for providing certain aspects of the wireless device's functionality, including any of the functionality described above and/or any additional functionality (including any functionality necessary to support the solution described above).

Figure 5B:
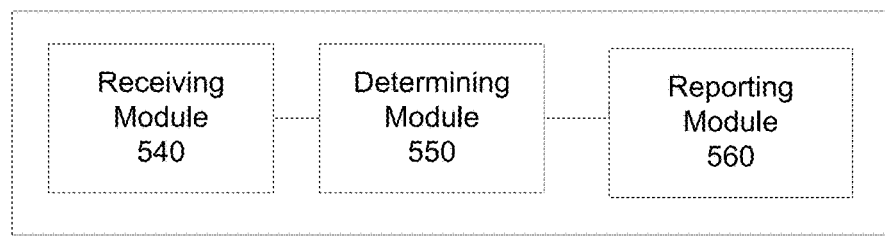
FIG. 5B is a block diagram illustrating example components of a wireless device.

FIG. 5B is a block diagram illustrating example components of a wireless device. The components may include receiving module 540, determining module 550, and reporting module 560.

Receiving module 540 may perform the receiving functions of wireless device 110. For example, receiving module 540 may receive an identification of network nodes from network node 120. In certain embodiments, receiving module 540 may include or be included in processor 520. Receiving module 540 may include circuitry configured to receive radio signals. In particular embodiments, receiving module 540 may communicate information to determining module 550 or reporting module 560.

Determining module 550 may perform the functions of wireless device 110 for determining whether a network node is included in a received identification of network nodes. In certain embodiments, determining module 550 may include or be included in processor 520. In particular embodiments, receiving module 450 may communicate information to reporting module 460 and receive information from receiving module 540.

Reporting module 560 may perform the reporting functions of wireless device 110. For example, reporting module 560 may report mobility events to network node 120. In certain embodiments, reporting module 560 may include or be included in processor 520. Reporting module 560 may include circuitry configured to transmit radio signals. In particular embodiments, reporting module 560 may receive information from determining module 550.

Figure 6A:
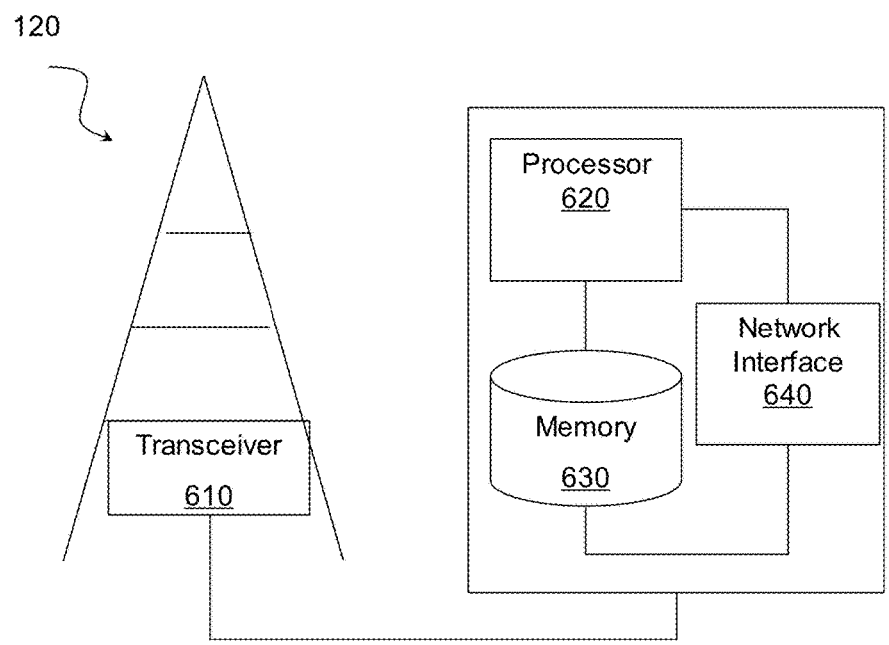
FIG. 6A is a block diagram illustrating an example embodiment of a radio network node.

FIG. 6A is a block diagram illustrating an example embodiment of a network node. Network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 610, at least one processor 620, at least one memory 630, and at least one network interface 640. Transceiver 610 facilitates transmitting wireless signals to and receiving wireless signals from a wireless device, such as wireless devices 110 (e.g., via an antenna); processor 620 executes instructions to provide some or all of the functionality described above as being provided by network node 120; memory 630 stores the instructions executed by processor 620; and network interface 640 communicates signals to backend network components, such as a gateway, switch, router, Internet, Public Switched Telephone Network (PSTN), controller, and/or other network nodes 120. Processor 620 and memory 630 can be of the same types as described with respect to processor 520 and memory 530 of FIG. 5A above.

In some embodiments, network interface 640 is communicatively coupled to processor 620 and refers to any suitable device operable to receive input for network node 120, send output from network node 120, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network. In particular embodiments, processor 620 in communication with transceiver 610 may transmit, to wireless device 110, an identification of network nodes used for traffic steering; may receive, from wireless device 110, a mobility report; and may update the identification of network nodes used for traffic steering based on the mobility report. For example, processor 620 in communication with transceiver 610 may perform the steps of method 400 illustrated in FIG. 4.

Other embodiments of network node 120 include additional components (beyond those shown in FIG. 6A) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 6B:
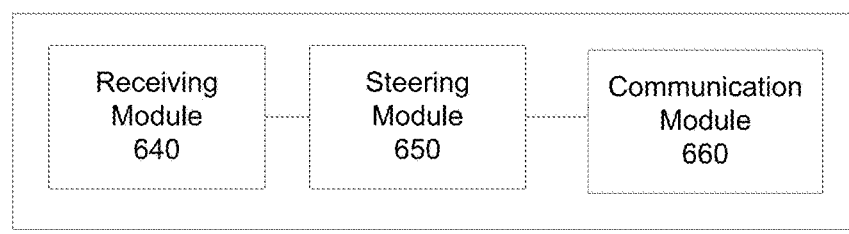
FIG. 6B is a block diagram illustrating example components of a network node.

FIG. 6B is a block diagram illustrating example components of a network node. The components may include receiving module 640, steering module 650, and communication module 660.

Receiving module 640 may perform the receiving functions of network node 120. For example, receiving module 640 may receive mobility reports from wireless devices 110. In certain embodiments, receiving module 640 may include or be included in processor 620. Receiving module 640 may include circuitry configured to receive radio signals. In particular embodiments, receiving module 640 may communicate information to steering module 650.

Steering module 650 may perform the traffic steering functions of network node 120. For example, steering module 650 may determine whether a wireless device 110 should move its traffic to a different network node. In certain embodiments, steering module 650 may include or be included in processor 620. In particular embodiments, steering module 650 may receive information from receiving module 640 and send information to communications module 650.

Communication module 660 may perform the communication functions of network node 120. For example, communication module 660 may send an identification of network nodes to wireless device 110. In certain embodiments, communication module 660 may include or be included in processor 620. Communication module 660 may include circuitry configured to send radio signals. In particular embodiments, communication module 660 may receive information from steering module 650.

Some embodiments of the disclosure may provide one or more technical advantages. In particular embodiments, reporting of mobility events from a WLAN to a 3GPP RAN avoids conflicts between WLAN and 3GPP RAN steering mechanisms. The 3GPP RAN may use the knowledge of the WLAN mobility event when determining what steering information to send to the UE, thus avoiding undesirable side effects.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
ANDSF Access Network Discovery and Selection Function
AP Access Point
APN Access Point Name
ANQP Access Network Query Protocol
ANPI Average Noise Power Indicator
BSSID Basic Service Set Identifier
CDMA2000 Code division multiple access 2000
CN Core Network
DRB Data Radio Bearer
eNB Enhanced Node-B
eNodeB Enhanced Node-B
GSM Global System for Mobile communication
HESSID Homogeneous Extended Service Set Identifier
LAN Local Area Network
LTE Long Term Evolution
MAC Media Access Control
MAN Metropolitan Area Network
MIMO Multi-Input Multi-Output
MTC Machine Type Communication
OPI Offloading Preference Indicator
PSTN Public Switched Telephone Network
QCI Quality of Service Class Identifier
RAN Radio Access Network
RAT Radio Access Technology
RB Radio Bearer
RCPI Received Channel Power Indicator
RF Radio Frequency
RNC Radio Network Controller
RRC Radio Resource Control
RSCP Received Signal Code Power
RSNI Received Signal Noise Indicator
RSRP Reference Signal Received Power
RSRQ Reference Symbol Received Quality
RSSI Received Signal Strength Indicator
SSID Service Set Identifier
SSP Subscription Service Provider
UE User Equipment
UMTS Universal Mobile Telecommunications System
WAN Wide Area Network
WiMAX Worldwide Interoperability for Microwave Access
WLAN Wireless Local Area Network

The invention claimed is:

1. A method in a wireless device operable in a first wireless communication network and a second wireless communication network, the method comprising:
receiving, from the first wireless communication network, an identification of one or more network nodes of the second wireless communication network, the one or more network nodes of the second wireless communication network operable to process traffic for the wireless device, wherein the first wireless communication network comprises a 3GPP radio access technology, and wherein the identification of one or more network nodes is used for traffic steering by the wireless device in the second wireless communication network, and wherein the second wireless communication network comprises a wireless local area network (WLAN) radio access technology;

receiving an instruction from the second wireless communication network to move traffic from a first network node of the second wireless communication network to a second network node of the second wireless communication network, the first network node one of the identified one or more network nodes of the second wireless communication network;

comparing an identification of the second network node to the received identification of one or more network nodes of the second wireless communication network to determine that the identification of the second network node is not included in the received identification of one or more network nodes of the second wireless communication network;

reporting, to the first wireless network, an indication of the instruction received from the second wireless communication network and the identification of the second network node of the second wireless communication network; and receiving, from the first wireless communication network, in response to the first wireless communication network receiving the identification of the second network node, an updated identification of one or more network nodes of the second wireless communication network operable to process traffic for the wireless device, the updated identification preventing conflicts between traffic steering instructions received from the first wireless communication network and the second wireless communication network.

2. The method of claim 1, further comprising reporting, to the first wireless network, a reason for moving traffic from the first network node of the second wireless communication network to the second network node of the second wireless communication network.

3. The method of claim 2, wherein the reason for moving traffic from the first network node of the second wireless communication network to the second network node of the second wireless communication network includes at least one of switching frequency bands, load balancing, signal quality, detected interference, priority service, and channel usage.

4. The method of claim 1, the updated identification including an identification of the second network node.

5. The method of claim 1, the updated identification not including an identification of the first network node.

6. A method in a network node of a first wireless communication network, the method comprising:

communicating, to a wireless device operable in the first wireless communication network and operable in a second wireless communication network, an identification of one or more network nodes of the second wireless communication network, the one or more network nodes of the second wireless communication network operable to process traffic for the wireless device, wherein the first wireless communication network comprises a 3GPP radio access technology, and wherein the identification of one or more network nodes is used for traffic steering by the wireless device in the second wireless communication network, and wherein the second wireless communication network comprises a wireless local area network (WLAN) radio access technology; and receiving, from the wireless device, a report that the wireless device, based on an instruction from the second wireless communication network, moved traffic from a first network node of the second wireless communication network to a second network node of the second wireless communication network, the report including the identification of the second network node of the second wireless communication network;

sending, in response to receiving the identification of the second network node, an updated identification of one or more network nodes of the second wireless communication network operable to process traffic for the wireless device, the updated identification preventing conflicts between traffic steering instructions received from the first wireless communication network and the second wireless communication network;

wherein the first network node is one of the identified one or more network nodes of the second wireless communication network; and wherein the second node is determined to not be one of the identified one or more network nodes of the second wireless communication network, the determination based on the wireless device comparing an identification of the second network node to the communicated identification of one or more network nodes of the second wireless communication network.

7. The method of claim 6, wherein the received report comprises a reason for moving the traffic from the first network node of the second wireless communication network to the second network node of the second wireless communication network.

8. The method of claim 7, wherein the reason for moving the traffic from the first network node of the second wireless communication network to the second network node of the second wireless communication network includes at least one of switching frequency bands, load balancing, signal quality, detected interference, priority service, and channel usage.

9. The method of claim 6, wherein the second network node is not included in the identification of one or more network nodes of the second wireless communication network.

10. The method of claim 6, further comprising:
updating the identification of one or more network nodes of the second wireless communication network to include an identification of the second network node.

11. The method of claim 6, further comprising:
updating the identification of one or more network nodes of the second wireless communication network not to include an identification of the first network node.

12. The method of claim 10, wherein the updated identification of one or more network nodes of the second wireless communication network is valid for a predetermined amount of time.

13. The method of claim 6, further comprising:
upon receiving the report that the wireless device moved traffic from the first network node of the second wireless communication network to the second network node of the second wireless communication network, suspending, for a predetermined amount of time, sending any instructions to the wireless device to move traffic.

14. A wireless device operable in a first wireless communication network and a second wireless communication network, the wireless device comprising a processor operable to:
- receive, from the first wireless communication network, an identification of one or more network nodes of the second wireless communication network, the one or more network nodes of the second wireless communication network operable to process traffic for the wireless device, wherein the first wireless communication network comprises a 3GPP radio access technology, and wherein the identification of one or more network nodes is used for traffic steering by the wireless device in the second wireless communication network, and wherein the second wireless communication network comprises a wireless local area network (WLAN) radio access technology;
- receive an instruction from the second wireless communication network to move traffic from a first network node of the second wireless communication network to a second network node of the second wireless communication network, the first network node one of the identified one or more network nodes of the second wireless communication network;
- compare an identification of the second network node to the received identification of one or more network nodes of the second wireless communication network to determine that the identification of the second network node is not included in the received identification of one or more network nodes of the second wireless communication network;
- report, to the first wireless network, an indication of the instruction received from the second wireless communication network and the identification of the second network node of the second wireless communication network; and
- receive, from the first wireless communication network, in response to the first wireless communication network receiving the identification of the second network node, an updated identification of one or more network nodes of the second wireless communication network operable to process traffic for the wireless device, the updated identification preventing conflicts between traffic steering instructions received from the first wireless communication network and the second wireless communication network.

15. The wireless device of claim 14, the processor further operable to report, to the first wireless network, a reason for moving traffic from the first network node of the second wireless communication network to the second network node of the second wireless communication network.

16. The wireless device of claim 15, wherein the reason for moving traffic from the first network node of the second wireless communication network to the second network node of the second wireless communication network includes at least one of switching frequency bands, load balancing, signal quality, detected interference, priority service, and channel usage.

17. The wireless device of claim 14, the updated identification including an identification of the second network node.

18. The wireless device of claim 14, the updated identification not including an identification of the first network node.

19. A network node of a first wireless communication network, the network node comprising a processor operable to:
- communicate, to a wireless device operable in the first wireless communication network and operable in a second wireless communication network, an identification of one or more network nodes of the second wireless communication network, the one or more network nodes of the second wireless communication network operable to process traffic for the wireless device, wherein the first wireless communication network comprises a 3GPP radio access technology, and wherein the identification of one or more network nodes is used for traffic steering by the wireless device in the second wireless communication network, and wherein the second wireless communication network comprises a wireless local area network (WLAN) radio access technology; and
- receive, from the wireless device, based on an instruction from the second wireless communication network, a report that the wireless device moved traffic from a first network node of the second wireless communication network to a second network node of the second wireless communication network, the first network node one of the identified one or more network nodes of the second wireless communication network, the report including the identification of the second network node of the second wireless communication network;
- sending, in response to receiving the identification of the second network node, an updated identification of one or more network nodes of the second wireless communication network operable to process traffic for the wireless device, the updated identification preventing conflicts between traffic steering instructions received from the first wireless communication network and the second wireless communication network;
- wherein the first network node is one of the identified one or more network nodes of the second wireless communication network; and
- wherein the second node is determined to not be one of the identified one or more network nodes of the second wireless communication network, the determination based on the wireless device comparing an identification of the second network node to the communicated identification of one or more network nodes of the second wireless communication network.

20. The network node of claim 19, wherein the received report comprises a reason for moving the traffic from the first network node of the second wireless communication network to the second network node of the second wireless communication network.

21. The network node of claim 20, wherein the reason for moving the traffic from the first network node of the second wireless communication network to the second network node of the second wireless communication network includes at least one of switching frequency bands, load balancing, signal quality, detected interference, priority service, and channel usage.

22. The network node of claim 19, wherein the second network node is not included in the identification of one or more network nodes of the second wireless communication network.

23. The network node of claim 19, the processor further operable to:
- update the identification of one or more network nodes of the second wireless communication network to include an identification of the second network node.

24. The network node of claim 19, the processor further operable to:

update the identification of one or more network nodes of the second wireless communication network not to include an identification of the first network node.

25. The network node of claim 23, wherein the updated identification of one or more network nodes of the second wireless communication network is valid for a predetermined amount of time.

26. The network node of claim 19, the processor further operable to:
upon receiving the report that the wireless device moved traffic from the first network node of the second wireless communication network to the second network node of the second wireless communication network, suspending, for a predetermined amount of time, sending any instructions to the wireless device to move traffic.

* * * * *